(12) United States Patent
Becker et al.

(10) Patent No.: US 9,028,107 B2
(45) Date of Patent: May 12, 2015

(54) LAMP, REFLECTOR FOR A LAMP AND METHOD FOR THE PRODUCTION OF THE REFLECTOR

(71) Applicant: Auer Lighting GmbH, 37581 Bad Gandersheim (DE)

(72) Inventors: Ralf Becker, Bad Gandersheim (DE); Markus Hoffmann, Bad Harzburg (DE)

(73) Assignee: Auer Lighting GmbH, Bad Grandersheim (DE)

( * ) Notice: Subject to any disclaimer, the term of this patent is extended or adjusted under 35 U.S.C. 154(b) by 14 days.

(21) Appl. No.: 13/832,117

(22) Filed: Mar. 15, 2013

(65) Prior Publication Data

US 2013/0258674 A1 Oct. 3, 2013

(30) Foreign Application Priority Data

Mar. 29, 2012 (DE) .......................... 10 2012 009 539

(51) Int. Cl.

| | |
|---|---|
| *F21V 7/00* | (2006.01) |
| *F21V 7/04* | (2006.01) |
| *F21V 7/22* | (2006.01) |
| *F21V 17/14* | (2006.01) |
| *F21V 17/16* | (2006.01) |
| *F21V 17/06* | (2006.01) |
| *C03B 11/10* | (2006.01) |
| *C03B 21/04* | (2006.01) |
| *F21Y 101/02* | (2006.01) |

(52) U.S. Cl.
CPC . *F21V 7/00* (2013.01); *F21V 7/048* (2013.01); *F21V 7/22* (2013.01); *F21V 17/14* (2013.01); *F21V 17/162* (2013.01); *F21V 17/164* (2013.01); *F21Y 2101/02* (2013.01); *F21V 17/06* (2013.01); *C03B 11/10* (2013.01); *C03B 21/04* (2013.01)

(58) Field of Classification Search
CPC ............. F21V 7/00; F21V 7/048; F21V 7/22; F21V 17/14; F21V 17/162; F21V 17/164; F21V 2101/02; F21V 17/06; C03B 11/10; C93B 21/04
See application file for complete search history.

(56) References Cited

U.S. PATENT DOCUMENTS

| | | | | |
|---|---|---|---|---|
| 3,662,165 | A | * | 5/1972 | Osteen et al. .................. 362/297 |
| 3,700,882 | A | * | 10/1972 | Planchon ....................... 362/298 |
| 4,021,659 | A | * | 5/1977 | Wiley ............................ 362/297 |

(Continued)

FOREIGN PATENT DOCUMENTS

| | | |
|---|---|---|
| DE | 10 2009 047 493 | 6/2011 |
| DE | 10 2010 031 312 | 1/2012 |

(Continued)

*Primary Examiner* — John A Ward
(74) *Attorney, Agent, or Firm* — Whitham Curtis Christofferson & Cook, PC

(57) ABSTRACT

A lamp has an LED, a base, and a reflector. The base is rigidly connected to the LED and has a base contact surface. The reflector, which can be connected to the base, has a reflector contact surface, an entry opening, an exit opening, and a longitudinal direction (L) that runs from the exit opening to the entry opening. The reflector contact surface is arranged in the longitudinal direction (L) between the entry opening and the exit opening, and the base contact surface abuts the reflector contact surface. Thus, movement of the base and/or reflector towards each other is prevented when the reflector is connected to the base. The reflector is formed in such a way that a projection of the reflector contact surface in the longitudinal direction (L) of the reflector is free of undercuts.

10 Claims, 12 Drawing Sheets

(56) References Cited

U.S. PATENT DOCUMENTS

| | | | |
|---|---|---|---|
| 4,447,865 A * | 5/1984 | VanHorn et al. | 362/305 |
| 6,080,464 A * | 6/2000 | Gampe et al. | 428/131 |
| 8,567,987 B2 * | 10/2013 | Wronski | 362/236 |
| 2004/0264200 A1 | 12/2004 | Hirano et al. | |
| 2008/0055912 A1 * | 3/2008 | Kittelmann et al. | 362/296 |
| 2011/0019409 A1 | 1/2011 | Wronski | |

FOREIGN PATENT DOCUMENTS

| | | |
|---|---|---|
| EP | 1 961 708 | 8/2008 |
| WO | WO2011/104255 | 9/2011 |
| WO | WO 2012/158404 | 11/2012 |

* cited by examiner

PRIOR ART

PRIOR ART

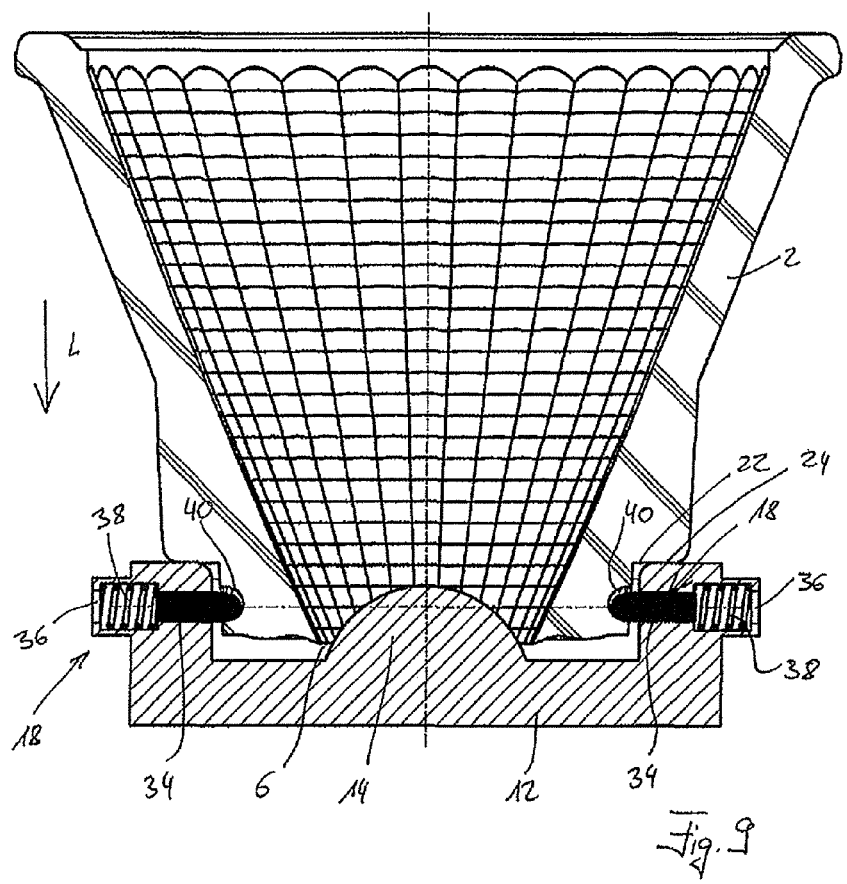

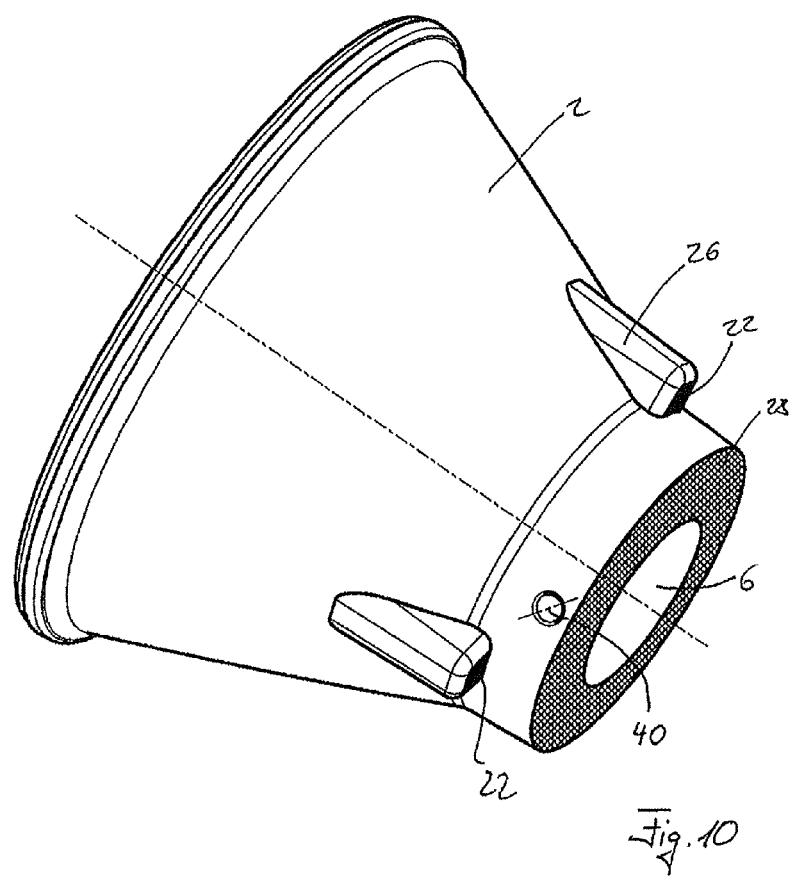

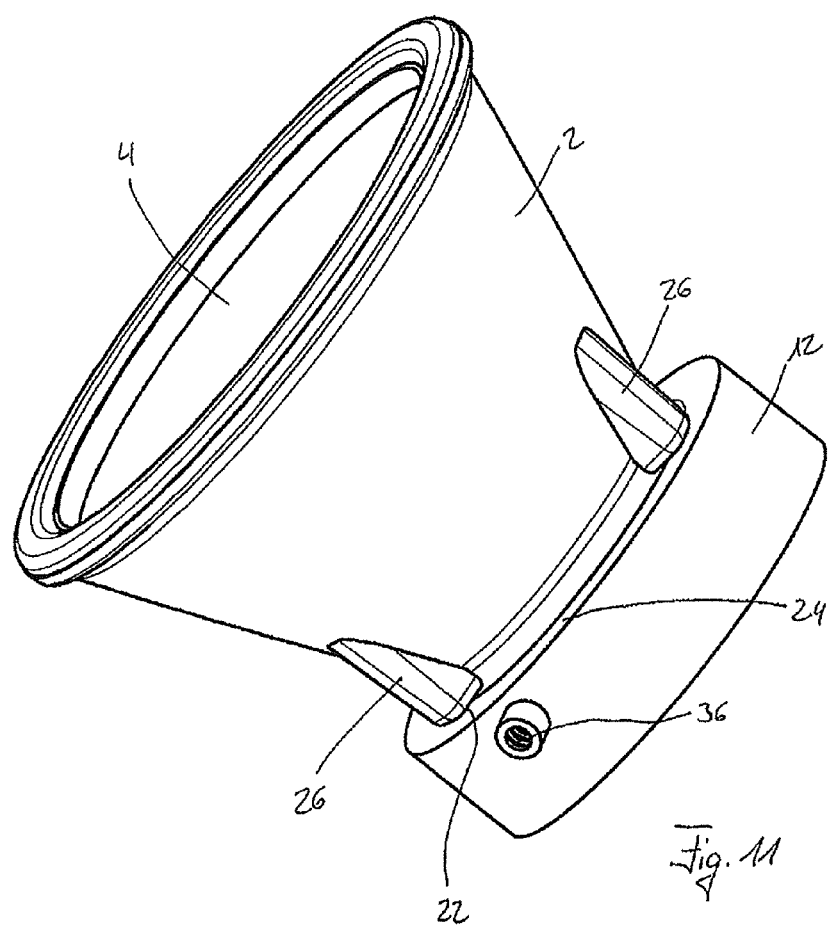

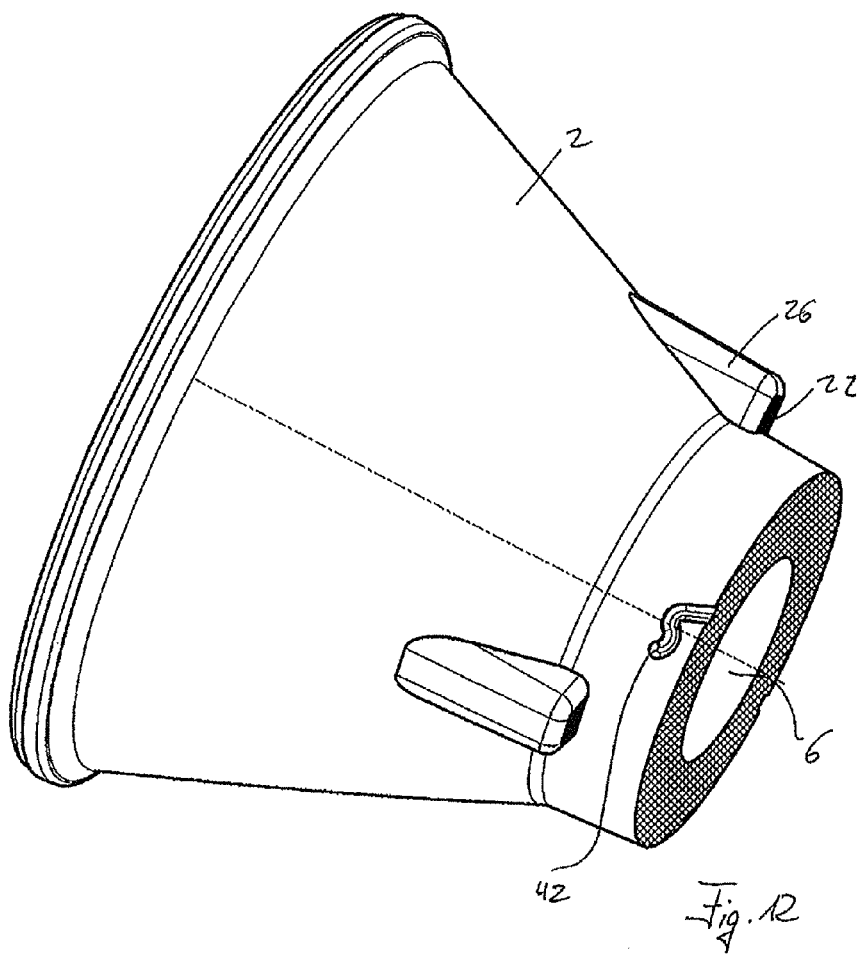

LAMP, REFLECTOR FOR A LAMP AND METHOD FOR THE PRODUCTION OF THE REFLECTOR

FIELD OF THE INVENTION

The invention refers to a lamp with at least one LED, a base that is rigidly connected to the at least one LED and that has at least one base contact surface, as well as a reflector, which has at least one reflector contact surface, an entry opening and an exit opening, and a longitudinal direction that runs from the exit opening to the entry opening, the reflector being connectable to the base, and the at least one base contact surface abutting the at least one reflector contact surface, thus preventing a movement of the base and/or reflector towards each other when the reflector is connected to the base. In addition the invention refers to a reflector for such a lamp and a method for the production of such a reflector.

BACKGROUND

Conventionally, a lamp according to the preamble is provided with at least one LED that is mounted on an LED semiconductor chip, which is mounted on the base. In this case, this base acts as a connecting component between the actual LED or the LED semiconductor chip and the reflector of the lamp. The mounting of the two components on each other can be done with a clip connection, for example. In this case, the base comprises elastic clips, for example, which are bent open when the reflector is inserted and lock into purpose-made slits, holes or passages on the reflector body.

The reflector itself comprises a longitudinal direction and an entry and exit opening, whereby the longitudinal direction of the reflector stretches from its entry opening to the exit opening. The exit opening is the opening through which the light emitted by the at least one LED leaves the reflector and hence the lamp. With most reflectors the longitudinal direction coincides with the optical axis and the axis of symmetry of the reflector and in this case, comprises the at least one LED.

The reflector very often comprises an inner surface that can be faceted, for example, in order to achieve the desired light emission characteristic. However, to do this it is necessary to arrange the LED in the desired position as precisely as possible. For example, with a reflector with an elliptical reflector inner surface, this can be a focus of the ellipse. It may also be beneficial to arrange the LED slightly in front of or behind this focus. The point where the LED must be arranged to achieve the desired light emission characteristic, in combination with the design of the reflector inner surface, is called the operating point. This is found mostly inside the reflector, so the LED protrudes through the entry opening of the reflector into the operating point. In order to achieve the desired emission characteristic, an exact a positioning as possible of the LED on the operating point is necessary.

The at least one reflector contact surface and the at least one base contact surface are provided to ensure this exact positioning. Both lie on top of each other when the reflector is connected to the base and thus prevent a further movement of the two components on top of each other. It is therefore possible to achieve a reproducible, very defined and well known positioning of the two components relative to each other. If the at least one reflector contact surface and the at least one base contact surface are produced accurately, the extent to which the LED protrudes into the reflector can be defined and reproduced in a precise way. Furthermore, should the LED not be arranged in the interior space of the reflector, the exact positioning of the reflector relative to the base is important. This situation also concerns the positioning of the reflector relative to the LED, so that the light emitted by the LED that enters the reflector through the entry opening possesses the desired emission characteristics when it leaves the reflector through the exit opening.

The reflector contact surface is conventionally the area directly around the entry opening of the reflector. In the connected state, this area of the reflector then preferably contacts the corresponding area of the base around the LED completely.

However, it is a disadvantage that this sort of lamp is relatively complex to produce. A reflector for a lamp of this sort is conventionally pressed from glass or glass ceramic. To do this, a mould is initially filled with a desired amount of glass or glass ceramic and then pressed in this mould between two movable moulding dies until it has the desired contour. The reflector that has been produced by this method is actually already fitted with an exit opening, but not yet with an entry opening. This is produced in a preferred embodiment of a method of this sort by a so-called "hot punch" method, whereby a mandrel or pin is guided through the pressed reflector at the desired point. So that the glass reflector does not shatter during this method, it must be heated or the insertion of the pin must occur at such a speed that the reflector has not yet cooled following the pressing. However, this leads to a deformation of the reflector area that is located around the desired entry opening. Yet as this area forms the reflector contact surface, it must have a complex finish, for example sawn or milled. This is complicated and therefore expensive. Furthermore, it is prone to errors, since the reflector contact surface that has been treated in this way must stand as exactly perpendicular as possible to the optical axis of the reflector, be as smooth as possible and be arranged precisely as possible at the correct height relative to the operation point of the reflector. As the serration or milling for the finishing of the reflector contact surface must take place in a separate step of the procedure, the relation to the optically relevant points on the inner surface of the reflector is compulsorily lost and thus the exact location of the operation point.

Moreover, a further tolerance of the saw cut or milling plane is added to the production tolerances that play a part during the pressing of the reflector and the production of the base. As a result, the precision achieved at a reasonable cost is greatly reduced.

Alternatively the entry opening could be created by, for example, milling in the reflector, rather than the "hot punch" method. This means that since the area surrounding the entry opening, which has been created in this way, is not or barely affected by the method, a complex post-treatment is unnecessary. However, the milling or drilling of the entry opening is time-consuming in comparison to the "hot punch" method and is therefore expensive. Furthermore, a separate tool must be used for milling, which adds to the above mentioned problems with production tolerance. Consequently this embodiment also has disadvantages.

Alternatively it is known from the prior art that, rather than producing the exact positioning of the reflector relative to the LED across the above described contact surfaces that are arranged around the entry opening, grooves or recesses can be made along the sides of the reflector neck, into which the structures on the base can lock into as precisely as possible. Serration or milling can also be used for this purpose. A backlash-free mounting could then also be achieved. However, the introduction of grooves or recesses into the pressed reflector creates a further step in the procedure and the resulting precision and tolerance problems. Moreover, a simple and exact positioning of the reflector relative to the LED is thereby not possible.

The WO 20121158404 A1 that was published after the filing date of the present application shows a reflector for a lamp whose reflector contact surface is arranged around the entry opening of the reflector. If the entry opening is made in the reflector body, the problems described occur as a result.

In EP 1 961 708 A1 a method is described to produce reflectors from glass, whereby the entry openings are created with the hot punch method in the reflector body. The part of the reflector body in which the entry openings are made is supported by a special holding device, so filament formation of the heated glass does not occur.

US 2004/0264200 A1 also deals with a method for producing a reflector for a lamp, in which various possibilities are given for creating the entry opening in the reflector body. However, in every method the lower area of the reflector body, in which the entry opening has been made, must be submitted to a thermal post treatment.

US 2011/0019409 A1, as well as DE 10 2010 031 312 A1, deals with the mounting of LED support elements on a lining. This should achieve as good a heat conductivity and thermal coupling as possible.

In WO 2011/104 255 A1 a so-called downlight, i.e. a lamp that shines downwards, is described, whereby the reflector is only held by placing it on a mounting ring. There is no contact with the base on which the LEDs are arranged.

In DE 10 2009 047 493 A1 a lamp device and a top unit for mounting on a lamp device are described, on which the locking element of a bayonet lock is arranged on the side of the reflector facing the LED. The reflector contact surface formed at the outer edge of the entry opening of the reflector.

SUMMARY

The invention thus aims to propose a lamp whose reflector is adjustable relative to the LED with sufficient accuracy and which is simple, quick and cost-effective to produce. Furthermore, a corresponding reflector and a production method for such a reflector should be proposed.

The invention solves the posed aim by means of a lamp according to the preamble which is characterized by the fact that the reflector is shaped in such a way that a projection of the at least one reflector contact surface in the longitudinal direction of the reflector is free of undercuts. In other words, starting from the reflector contact surface, there is no further part of the reflector in the longitudinal direction. Should the reflector be arranged in such a way that the exit opening is at the top and the entry opening at the bottom, for example, the longitudinal direction runs from top to bottom. With a reflector according to the invention, starting from the at least one reflector contact surface, there is no further part of the reflector in the downward direction, so that the projection of the at least one reflector contact surface is free of undercuts in this direction.

However, this does not mean that the at least one reflector contact surface would be the lowest part of the reflector in this arrangement. On the contrary, with a reflector of a lamp according to the preamble, the at least one reflector contact surface is arranged in the longitudinal direction between the entry opening and the exit opening. As a result, in the named arrangement there are parts of the reflector which are arranged higher up, as well as parts of the reflector which are arranged lower than the at least one reflector contact surface. Unlike in the prior art, the at least one reflector contact surface is therefore not a wall of a groove in the reflector. To be clear, the at least one reflector contact surface in this arrangement of the reflector is visible in a vertical view from below.

This arrangement of the at least one reflector has the advantage that the at least one reflector contact surface can be manufactured with a higher accuracy during a conventional pressing procedure. As a result, a second consequent step in the procedure is not needed to give the at least one reflector contact surface a post treatment using an expensive sawing or milling process, or to form it into the reflector. Moreover, the use of another tool for this purpose is superfluous, meaning that the production tolerances of the respective tools and steps in the procedure no longer add up, so that, in total, a more precise arrangement of the reflector and thus a more precise positioning of the reflector relative to the at least one LED in the lamp are possible.

In a special arrangement of such a reflector, a circumferential ridge or several individual ridges can be arranged on an outer side of the reflector, for example, which each form a reflector contact surface. The reflector is then only positioned above the definite arrangement of this at least one reflector contact surface and the respective at least one base contact surface relative to the at least one LED.

For a reflector for a lamp according to the invention the form of the neck area of the reflector where the entry opening of the reflector is located is no longer important, as this neck area is no longer used to position the reflector relative to the at least one LED. As a result, this area could be irregularly shaped, sloping or otherwise, without affecting the positioning accuracy of the reflector relative to the LED. The entry opening in a reflector such as this can therefore be made particularly easily with the so-called hot punch method, as the deformation of the surfaces arranged around the entry opening is unproblematic.

In a preferred embodiment the lamp comprises preloading devices that preload the at least one reflector contact surface against the at least one base contact surface. These preloading devices are not necessary for the actual positioning of the reflector relative to the at least one LED, but ensure that the reflector does not move from the set position once it has been connected to the base. To do this, grooves or other mechanical holding elements can be located on the outer side of the reflector, for example. With the aid of these, the reflector is secured on the base, for example by clipping it on. These mechanical holding elements and the purpose-made structures are preferably situated on the ridges or the circumferential ridge on which the at least one reflector contact surface is also located. Alternatively, it is also conceivable that these structures are not found on the ridges themselves, but rather are mounted separately at a considerable distance on the outer surface of the reflector. The structures can be, for example, bulges, protrusions, indentations or grooves on the outer surface of the reflector, which can be brought into contact with the base using correspondingly designed mechanical counter-structures, which are found on the base. In this way, it is possible to mount the reflector on the base in a particularly simple way, for example by snapping or clipping it in, or by means of a bayonet lock, for example. These structures have no influence on the optical alignment of the reflector relative to the at least one LED, as has already been demonstrated, so they do not have to produced with the same precision.

It has been proven to be an advantage that as a result of this, the area surrounding the entry opening no longer lies on the base, an air gap occurs at this point, which can be used to cool the lamp.

The reflector preferably comprises an outer surface that has at least one recess which the preloading devices lock into when the reflector is connected to the base. The preloading devices themselves do not have to be designed as one piece with the base, but can also be made as separate components. In this way it is conceivable, for example, to provide spring loaded pins on the base which lock into the purpose made recesses in the reflector when the reflector is correctly positioned relative to the base. They then exert a force on the reflector and preload the reflector contact surface against the base contact surface.

In a preferred embodiment the lamp comprises at least two reflector contact surfaces and at least two base contact surface. This ensures a simple and secure positioning of the reflector relative to the base, and thus to the LED which is rigidly connected to the base. The number and arrangement of the individual contact surfaces can be freely selected according to the relevant requirements.

The reflector preferably has a length D along its longitudinal direction. A distance d between the at least one recess, which the preloading devices lock into and the entrance opening, has a value of less than one third of the length in the longitudinal direction D, preferably less than a quarter, and especially preferably less than one fifth. This ensures that the distances across which the preloading devices have to apply force to the reflector are small, in comparison to the length D of the reflector, so that a particularly high mechanical stability is achieved. The most precise positioning possible of the reflector relative to the at least one LED is thereby also ensured, if outside forces, such as bumps or hits, act on at least one of the components. In addition, the effect of longitudinal changes due to varying temperatures is minimized.

The reflector is preferably produced in one piece made from glass or glass ceramic. This results in a particularly simple production, wherein a high speed production and low production costs can be achieved.

Should the preloading devices lock into corresponding purpose-made recesses or grooves on the outer side of the reflector, it has been proven to be advantageous if the preloading devices only lie on one wall of the respective recess, so as not to arrange the system so that it is mechanically overdetermined, thereby affecting the exact positioning of the reflector relative to the at least one LED. The preloading devices lie on the wall of the recess via which they can exert a force on the reflector, which presses the at least one reflector contact surface and the at least one base contact surface against each other.

In addition, the invention solves the problem at hand with a reflector for a lamp as described above. A method according to the invention for producing a reflector of this sort comprises the steps:
a) The pressing of the reflector made from glass or glass ceramic,
b) The formation of the entry opening in the reflector, so that the at least one reflector contact surface does not deform.

The special arrangement and alignment of the at least one reflector contact surface of a reflector for a lamp according to the invention means that the at least one reflector contact surface can be produced with the necessary precision and flatness in the pressing procedure. In addition, the entry opening can be made in the reflector without the reflector contact surface becoming deformed, so that a post-treatment of the reflector contact surface is not necessary.

The creation of the entry opening preferably involves puncturing the reflector at an entry point with a pin. It is particularly preferable if a smoothing of the at least one reflector contact surface following pressing, especially using sawing, milling or grinding, is not necessary.

The hot punching, stamping or puncturing of holes in glass or glass ceramic reflectors is already known from the prior art.

For this, the reflector base, which is closed prior to pressing, is punctured by a pin when warm, directly after the pressing, or once it has been reheated after cooling down. Not only is the base of the reflector neck, into which the entry opening is to be made, punctured and the desired hole created, but also the surrounding area around the reflector neck, which is generally circular, is greatly affected, as it is deformed by the puncture process. This deformation is not avoided in a method according to the invention, yet does not lead to problems, as the deformed area of the reflector neck is not used for the positioning of the reflector relative to the at least one LED. The reflector neck, which may be deformed, that is opened with the entry opening, has no contact with the at least one LED or the LED chip carrying it. Therefore it is not dependent on the exact end contour of this section of the reflector neck.

BRIEF DESCRIPTION OF THE DRAWINGS

With the aid of a drawing an embodiment of the present invention will be explained in more detail. It shows FIG. 1—a schematic section view through a lamp according to the prior art, FIG. 2—an enlarged section from FIG. 1, FIG. 3—a reflector for a lamp from the prior art in a schematic 3D view, FIG. 4—a schematic section display through a lamp according to a first embodiment of the present invention, FIG. 5—an enlarged section from FIG. 4, FIG. 6—a reflector for a lamp according to an embodiment of the present invention in a schematic 3D view, FIG. 7—a reflector for a lamp according to a second embodiment of the present invention in a schematic 3D view, FIG. 8—the schematic side view of a lamp according to a further embodiment of the present invention, FIG. 9—the schematic section display through a lamp according to a further embodiment of the present invention, FIG. 10—a reflector for a lamp according to a further embodiment of the present invention, FIG. 11—a schematic partial view of a lamp according to an embodiment of the present invention, and FIG. 12—a reflector for a lamp according to a further embodiment of the present invention in a schematic 3D view.

DETAILED DESCRIPTION

Figure 1:
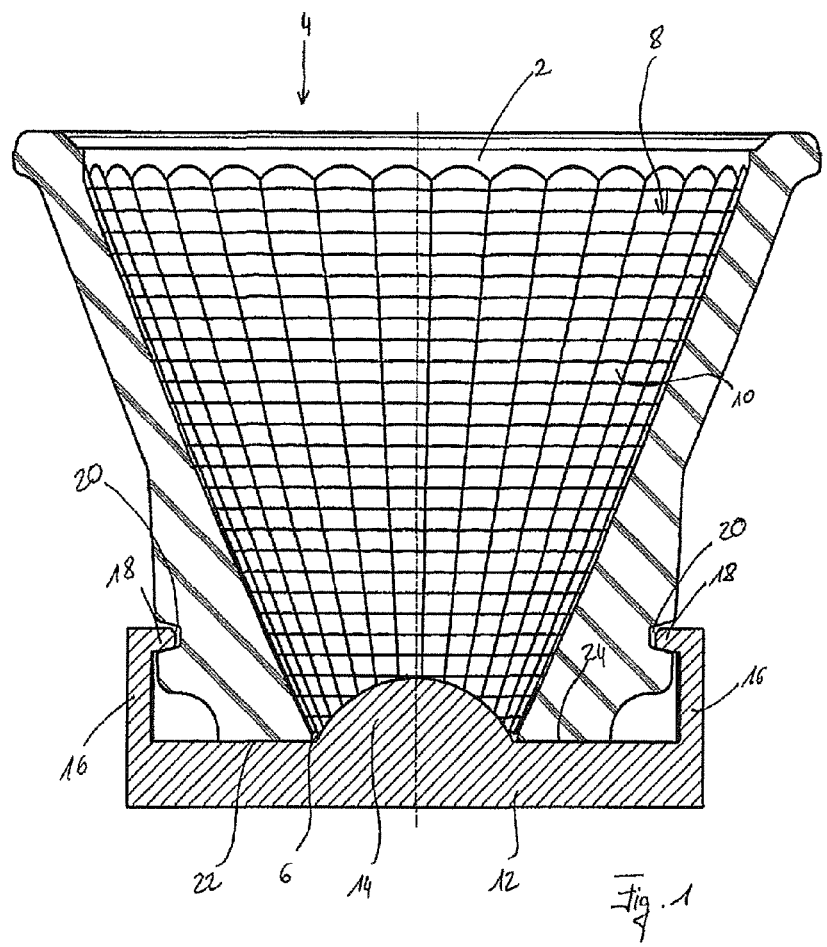

FIG. 1 shows a schematic view display through a lamp according to the prior art. The lamp comprises a reflector 2 that has an exit opening 4 and an entry opening 6, and which has facets 10 on a reflector inner side 8. Unfaceted reflector inner sides 8 are of course also conceivable.

The lamp comprises a base 12 onto which an LED 14 is arranged, which is depicted as a bump in FIG. 1. This can refer to the actual LED 14 or an optical lens, which is located above the actual LED chip. A simple protective cover, made of silicon for example, located above the actual LED chip is also possible, which should protect the semiconductor chip from dust and moisture.

Two holding elements 16 are arranged at the side of the base 12, each with a preloading device at the upper end, with which they lock into purpose made grooves 20 on the reflector 2. The reflector itself has a reflector contact surface 22 on its underside that surrounds the entry opening 6 and with which it abuts entirely the base contact surface 24. The fact that the reflector contact surface 22 abuts the base contact surface 24 prevents a further movement of the reflector 2 and/or the base 12. Both contact surfaces 22, 24 are therefore responsible for the positioning of the reflector 2 relative to the LED 14.

Consequently, the reflector contact surface 22, as well as the base contact surface 24, must be made as precisely as possible.

Figure 2:
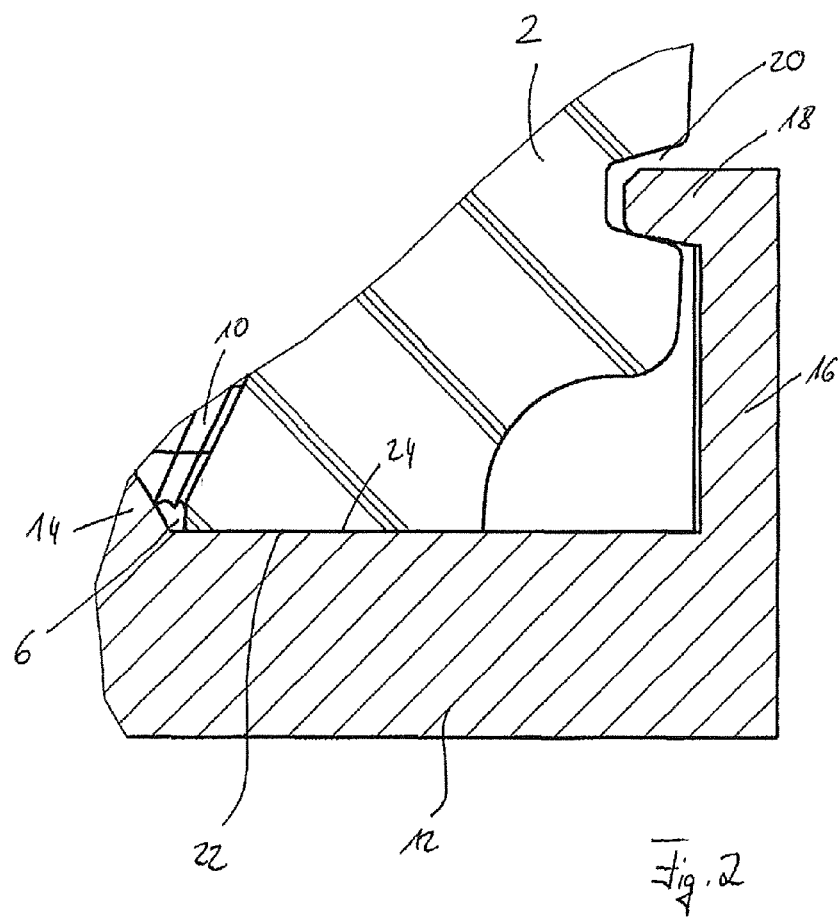

FIG. 2 shows an enlarged section from FIG. 1, wherein it can again be recognized that the reflector contact surface 22 abuts the base contact surface 24 and is thus responsible for the positioning of the reflector 2 relative to the LED 14. The preloading device 18 on the holding element 16 locks into the groove 20 and also lies on top of the reflector 2. However, this does not prevent a movement of the reflector 2 onto the base 12, rather it only applies a preload force on the reflector 2. The at least one reflector contact surface 22 and the at least one base contact surface 24 are pressed against each other by this preload force. To do this, the groove 20 and, for example, the length of the holding element 16 do not have to be made as precisely as the reflector contact surface 22 and the base contact surface 24. It is only important that a preload force is exerted on the reflector 2. The positioning of the reflector 2 relative to the LED 14 is not affected as a result.

Figure 3:
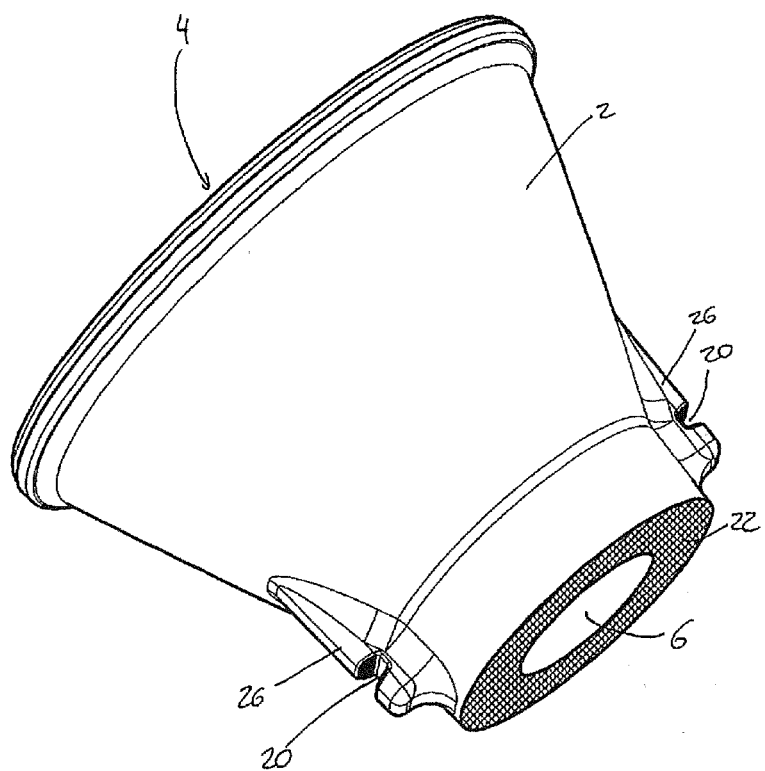

FIG. 3 shows the reflector 2 from FIGS. 1 and 2 in a schematic 3D view. It is possible the recognize the reflector contact surface 22 that surrounds the entry opening 6. The reflector contact surface 22 has had a post treatment by milling or sawing in order to achieve the desired accuracy. The grooves 20 are inserted into purpose made ridges 26 on the reflector 2. Alongside the tolerance which plays a role regarding the contour dimensions of the reflector 2 and which can have a value of +/−0.2 mm for example, a further tolerance of the saw cut or the milling plane relative to the outer contour of the reflector 2 accompanies the tolerances of the actual pressing tools. These can also lie within the range from +/−0.2 mm to +/−0.3 mm, so that the actual total tolerance or variation is, in parts, more than doubled. This results in increased inaccuracies and a worse positioning of the reflector 2 relative to the LED 14.

Figure 4:
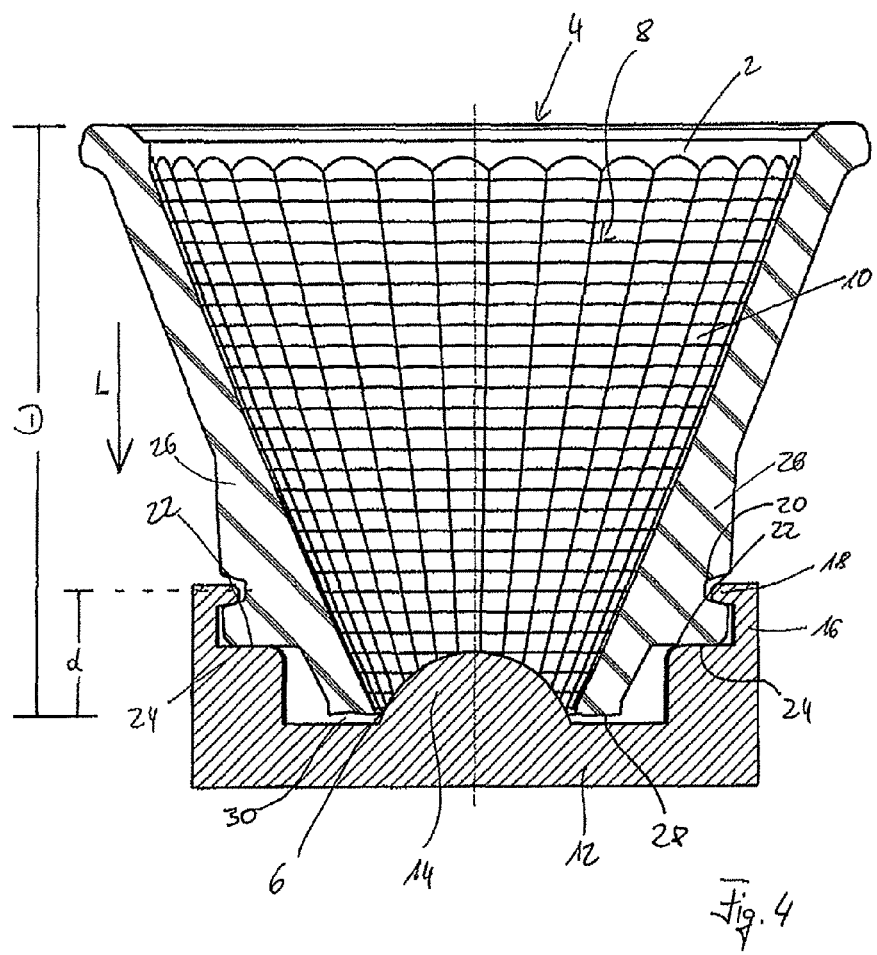

FIG. 4 shows a lamp according to a first embodiment of the present invention. It is possible to recognize the exit opening 4, the entry opening 6 and the inner side 8 of the reflector, onto which facets 10 are arranged. The LED 14, which is mounted on the base 12, protrudes into the entry opening 6. However, it can be seen that the reflector contact surface 22 is no longer arranged at the same height as the entry opening 6, but in the longitudinal direction L between the entry opening and the exit opening 4. The base contact surface 24 of the base 12 is also moved correspondingly.

As a consequence, it can be recognized that the reflector 2 comprises parts which are arranged further down than the reflector contact surface 22, such as one of the bottom surfaces 28 surrounding the entry opening 6. However, no other part of the reflector 2 is located directly underneath the reflector contact surface 22. This corresponds to the arrangement of the reflector according to the invention, which is formed in such a way that a projection of the at least one reflector contact surface 22 in the longitudinal direction of the reflector 2 is free of undercuts. Furthermore, two ridges 26 are arranged on the reflector 2, each comprising a groove 20 which the preloading devices 18 on the holding elements lock into. However, these only serve to exert a preload force on the reflector 2 and thus keep it in its position, as defined by the reflector surface 22 and the base contact surface 24. These elements have no influence on the alignment of the reflector 2 relative to the LED 14.

In addition, a length D of the reflector 2 and a distance d are depicted in FIG. 4, the latter being the distance between the groove 20 and the entry opening 6. It can be seen that the distance d is small in comparison to the length D. This results in a high mechanical stability.

There is a gap 30 between the bottom surface 28 of the reflector 2 and the surface of the base 12 situated opposite, which can be used to cool the lamp, for example.

By way of example, the preloading device 18 and the holding elements 16 are shown in the form of hook elements. Of course other sorts of preloading devices 18 are conceivable.

Figure 5:
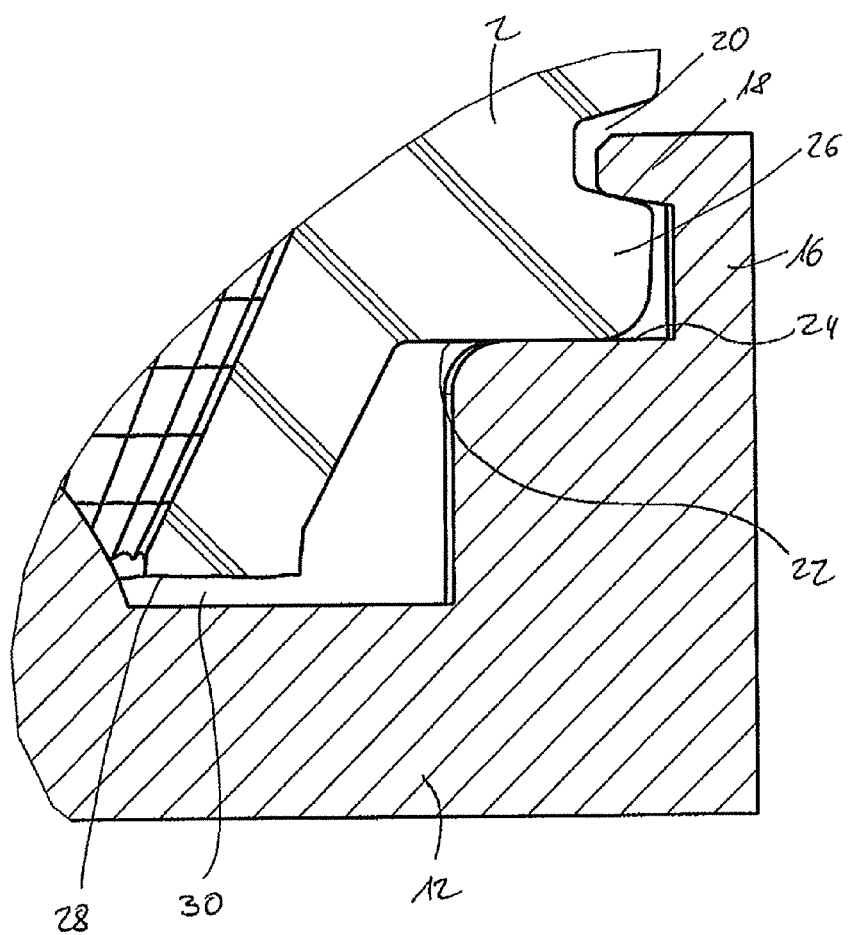

FIG. 5 shows an enlarged section from FIG. 4. In the enlarged depiction, it is clear to see that the expansion of the gap 30 between the bottom surface 28 and the base 12 is only determined by the reflector contact surface 22 and the base contact surface 24, and not by the contact between the preloading device 18 and the one side of the groove 20. In order to make it especially clear that the bottom surface 28 is not suitable for such an arrangement, it is depicted as wavy and slightly bevelled.

Figure 6:
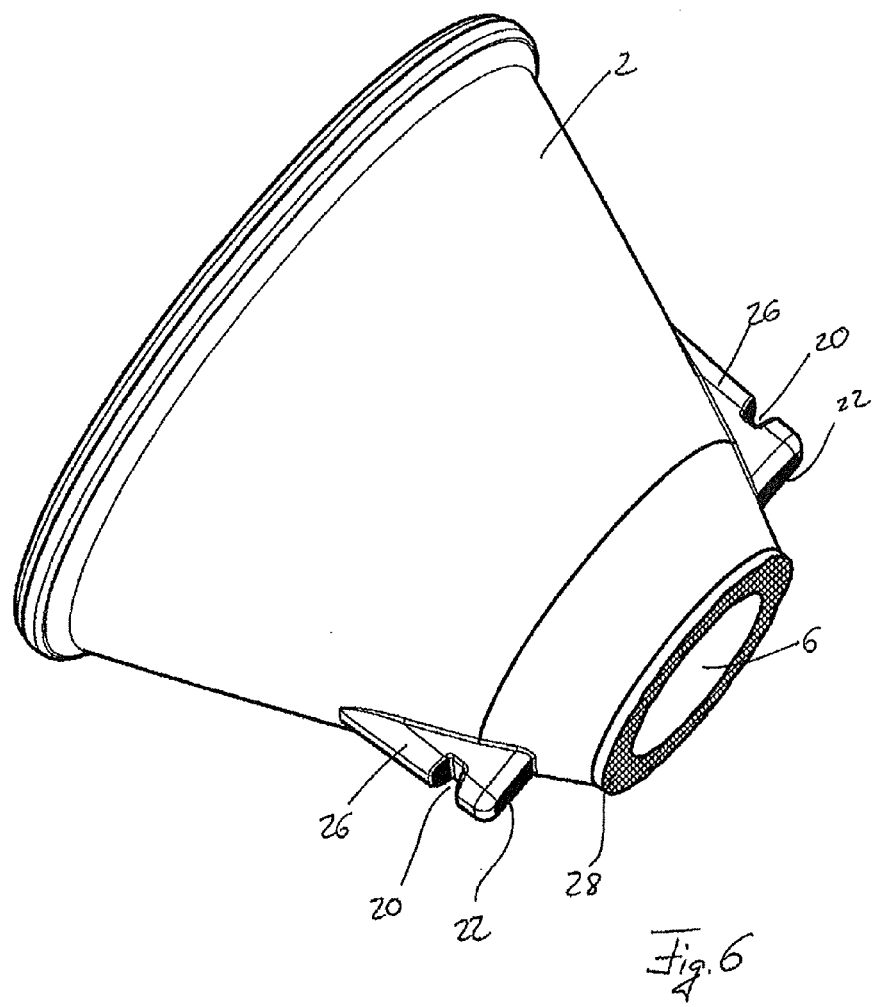

FIG. 6 shows the reflector 2 from FIGS. 4 and 5 in a schematic 3D view. The irregularly shaped bottom surface 28 surrounding the entry opening 6 is not suitable for an exact positioning of the reflector 2 relative to the LED 14 of the base 12, due to its irregular shape and contour. The reflector contact surfaces 22 on the under side of the ridges 26 are intended for this purpose. The grooves 20, which the preloading devices 18 can lock into, are again located in the ridges 26. The preloading device 18 and the groove 20 on a side panel of the groove 20 preferably only come into contact in order to avoid the system being overdetermined.

Figure 7:
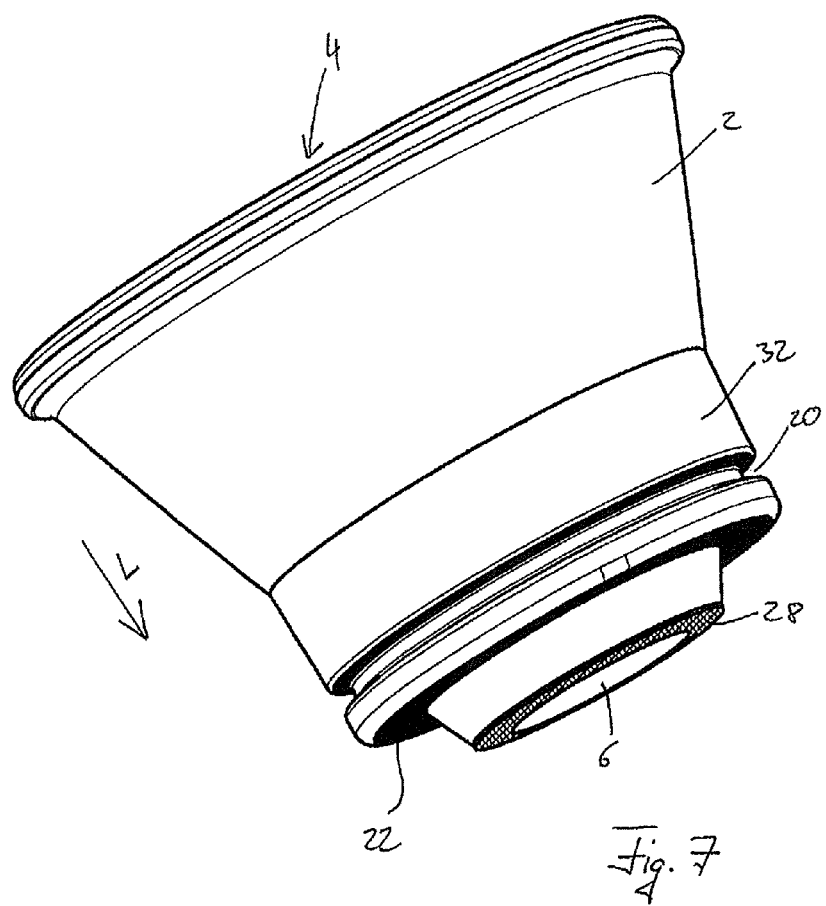

FIG. 7 shows the reflector 2 for a further embodiment of the present invention in a schematic 3D view. The bottom surface 28 surrounds the entry opening 6 of the reflector 2. Unlike the reflector 2 shown in FIG. 6, the reflector 2 shown in FIG. 7 has a circumferential reflector contact surface 22, by means of which the reflector 2 can be connected to the relevant base 12 in every angle alignment. Correspondingly, the reflector 2 does not have individual ridges 26, but a circumferential bulge 32. This can also be perceived as an individual circumferential ridge, into which the now circumferential groove 20 is inserted, which the preloading devices 18 arranged on the base 12 can lock into. On the underside of the bulge is the even and smoothly pressed reflector contact surface 22. Should the base 12 also comprise a circumferential base contact surface 24, the reflector contact surface 22 lies entirely on top of this base contact surface 24. Alternatively, the two contact surfaces 22, 24 can also be brought into contact section by section only. As this reflector contact surface 22 shown in FIG. 7 is arranged in the longitudinal direction L of the reflector between the entry opening 6 and the exit opening 4, this reflector contact surface 22 is not affected if the hot punch method is to be carried out, during which the entry opening 6 is made in the bottom surface 28. Also in this arrangement, no other component of the reflector 2 is located directly below the reflector contact surface 22 in the longitudinal direction L, so that the projection of the at least one reflector contact surface 22 in the longitudinal direction L of the reflector 2 is free of undercuts.

Figure 8:
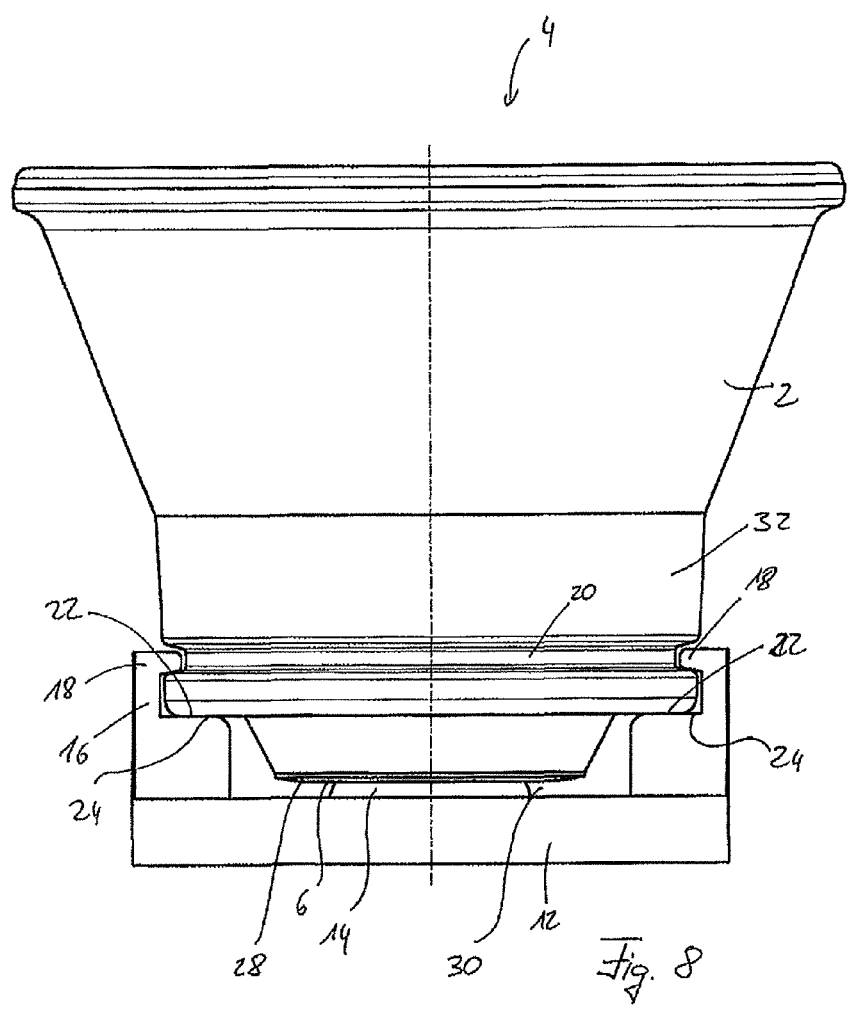

FIG. 8 shows the reflector 2 from FIG. 7 in a schematic side view, in connection with the base 12. Directly next to the entry opening 6 into which the LED 14 protrudes, the ring-shaped bottom surface 28 can be seen, whose contour is irrelevant for the positioning of the reflector 2. The circumferential groove 20 can be recognized, which the preloading devices 18 arranged on the holding elements 16 lock into. All other forms of known preloading devices 18 are of course also conceivable here. This can be, for example, a number of mounted hooks distributed across the area that are arranged at certain distances on the base 12 and lock into the ring-shaped groove 20. Of course, the groove 20 does not have to be completely circumferential. It is sufficient for it to be located where preloading devices 18 are provided, which should lock into the groove 20. Furthermore, the rotation symmetry of the reflector 2 and the base 12 suggested in FIG. 8 is only preferable, but not necessary for the present invention. In FIG. 8 the gap 30 between the bottom surface 28 and the base 12 can also be clearly recognized. The contact here between the preloading devices 18 and the groove 20 is not crucial for the positioning of the reflector relative to the LED; it only holds the reflector in its position as defined by the reflector contact surface 22 and the base contact surface 24.

FIG. 9 shows a schematic view display through a lamp according to a further embodiment of the present invention. Unlike with the previously depicted embodiments, the preloading devices 18 are no longer designed to be in one piece with the base 12. It refers much more to pins 34 that are stored spring-loaded by spring elements 38 in purpose made holes 36. Should the reflector 2 be inserted from above, the pins 34 are pushed outwards against the spring elements 38 and do not snap back into place until the pins 34 can lock into purpose made recesses 40. However, this also only causes a preload, so that a force is exerted on the reflector 2. The at least one reflector contact surface 22 and the at least one base contact surface 24 are pushed against each other by this force. In FIG. 9, it can be recognized that the pins 34 do not lock into the recesses 40 centrally, rather they only lie on top of one—the lower-panel of the recess 40 and thus exert the force on the reflector 2. The actual positioning of the reflector 2 relative to the LED 14 is done by the reflector contact surface 22, now arranged above the preloading devices 18, and the corresponding base contact surface 24.

Although the recesses 40 for the pins 34 are located lower down in the embodiment shown, i.e. in the longitudinal direction between the entry opening 6 and the reflector contact surface 22, no other part of the reflector 2 is arranged directly below the individual reflector contact surfaces 22, so that here, a projection of the at least one reflector contact surface 22 in the longitudinal direction L of the reflector is also free of undercuts.

FIG. 10 shows the reflector from FIG. 9 in a schematic 3D view. The reflector 2 has three ridges 26, two of which are shown. In each case, the ridges are arranged 120° displaced from each other on the outside of the reflector 2. On their underside are the reflector contact surfaces 22, which have been pressed smooth. On the reflector neck are the recesses 40 which the pins 34 shown in FIG. 9, acting as preloading devices 18, can lock into. In this depicted embodiment, the bottom surface 28 is also irrelevant for the positioning of the reflector 2 relative to the LED 14.

FIG. 11 shows the reflector 2 from FIG. 10, which is connected to the base 12. On the base 12, one of the holes 36 can be recognized, into which a pin 34 is guided, acting as a preloading device 18. The reflector 2 has three ridges 26, each provided with a reflector contact surface 22. In contrast, the base 12 has one circumferential base contact surface 24.

It is of course sufficient if a base contact surface 24 is only provided in the areas in which there is also a reflector contact surface 22. This can result in recesses which, from a thermal perspective, can be useful for cooling the arrangement, for example. In this case the heat generated by the LED 14 does not have to leave the reflector 2 through the exit opening 4, but can escape through the entry opening 6 and the gap 30 between the reflector 2 and the base 12.

FIG. 12 shows a schematic view of the reflector 2 for a further embodiment of the present invention. The difference to the reflector 2 depicted thus far is in a notch 42, which the purpose made pin element on the base 12 can lock into. The reflector 2 can of course have several of these notches 42, which are distributed equidistantly across the area. The corresponding pin elements on the base 12 lock into the notches 42 so that the two components are connected with each other in the same way as a bayonet lock and can be preloaded.

In this case, the notch 42 is also located in a reflector neck, which is situated lower than the reflector contact surface 22, i.e. more towards the entry opening 6. Nevertheless, there is no reflector part located directly below this reflector contact surface 22, i.e. within the projection in the longitudinal direction L of the reflector 2, so that this projection is also free of undercuts.

REFERENCE NUMERALS

L Longitudinal direction
D Length
d Distance
2 Reflector
4 Exit opening
6 Entry opening
8 Reflector inner side
10 Facet
12 Base
14 LED
16 Holding element
18 Preloading device
20 Groove
22 Reflector contact surface
24 Base contact surface
26 Ridge
28 Bottom surface
30 Gap
32 Bulge
34 Pin
36 Hole
38 Spring element
40 Recess
42 Notch

The invention claimed is:
1. A lamp, comprising
    at least one LED;
    a base, wherein
        the base is rigidly connected to the at least one LED and
        the base has at least one base contact surface; and
    a reflector which is connectable to the base, wherein the reflector includes
        at least one reflector contact surface,
        an entry opening and an exit opening, and
        a longitudinal direction that runs from the exit opening to the entry opening,
    wherein the at least one reflector contact surface is arranged in the longitudinal direction between the entry opening and the exit opening, and the at least one base contact surface abuts the at least one reflector contact surface preventing a movement of the base and/or reflector towards each other when the reflector is connected to the base, and
    wherein a projection of the at least one reflector contact surface in the longitudinal direction of the reflector is free of undercuts.
2. The lamp according to claim 1, further comprising preloading devices which preload the at least one reflector contact surface against the at least one base contact surface.

3. The lamp according to claim 2, wherein the reflector has an outer surface that comprises at least one recess which the preloading devices lock into when the reflector is connected to the base.

4. The lamp according to claim 3, wherein the reflector has a length (D) along its longitudinal direction and a distance (d) from the at least one recess to the entry opening in the longitudinal direction which is smaller than one third of the length (D).

5. The lamp according to claim 4, wherein the distance (d) is less than a quarter of the length (D).

6. The lamp according to claim 5, wherein the distance (d) is less than one fifth of the length (D).

7. The lamp according to claim 3, wherein the at least one recess is a groove.

8. The lamp according to claim 1, wherein the at least one reflector contact surface includes at least two reflector contact surfaces and the at least one base contact surface includes at least two base contact surfaces.

9. The lamp according to claim 1, wherein the reflector is produced in one piece from glass or a glass ceramic.

10. A reflector for connecting to a base of a lamp, comprising:
- at least one reflector contact surface;
- an entry opening and an exit opening; and
- a longitudinal direction that runs from the exit opening to the entry opening,
- wherein the at least one reflector contact surface is arranged in the longitudinal direction between the entry opening and the exit opening and the at least one reflector contact surface abuts at least one base contact surface of the base preventing a movement of the base and/or reflector towards each other when the reflector is connected to the base, and
- wherein a projection of the at least one reflector contact surface in the longitudinal direction of the reflector is free of undercuts.

* * * * *